United States Patent
Pittaluga et al.

(10) Patent No.: US 11,223,419 B1
(45) Date of Patent: Jan. 11, 2022

(54) OPTICAL SYSTEM AND METHOD

(71) Applicant: Kabushiki Kaisha Toshiba, Tokyo (JP)

(72) Inventors: Mirko Pittaluga, Cambridge (GB); Zhiliang Yuan, Cambridge (GB); Andrew James Shields, Cambridge (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 17/187,518

(22) Filed: Feb. 26, 2021

(30) Foreign Application Priority Data

Dec. 24, 2020 (GB) .................................. 2020609

(51) Int. Cl.
*H04B 10/00* (2013.01)
*H04B 10/079* (2013.01)
(Continued)

(52) U.S. Cl.
CPC ....... *H04B 10/0799* (2013.01); *H04B 10/503* (2013.01); *H04B 10/61* (2013.01); *H04J 14/02* (2013.01)

(58) Field of Classification Search
CPC ............ H04B 10/0799; H04B 10/6165; H04B 10/503; H04B 10/61; H04B 10/5561; H04B 10/6971; H04B 10/516; H04J 14/02
(Continued)

(56) References Cited

U.S. PATENT DOCUMENTS

2011/0170695 A1 7/2011 Fujiwara et al.
2012/0294625 A1* 11/2012 Dynes .................. H04L 9/0852
398/155
(Continued)

FOREIGN PATENT DOCUMENTS

CN 111314071 A 6/2020

OTHER PUBLICATIONS

Combined Great Britain Office Action and Search Report dated Jun. 25, 2021 in Great Britain Patent Application No. 2020609.0, 6 pages.

(Continued)

*Primary Examiner* — Hibret A Woldekidan
(74) *Attorney, Agent, or Firm* — Oblon, McClelland, Maier & Neustadt, L.L.P.

(57) ABSTRACT

An optical system comprising a first emitter and a receiver, said first emitter comprising an encoding unit configured to encode information using phase on a first optical information signal, said first information signal having a single first wavelength, said emitter being configured to output a reference signal, said reference signal having a reference wavelength which is different to the first wavelength, the emitter further comprising a multiplexer configured to multiplex the first information signal and the reference signal to produce a multiplexed first signal and output the multiplexed first signal to a communication channel said receiver comprising:
  a de-multiplexer configured to de-multiplex the multiplexed first signal received from the emitter to extract the first information signal and the reference signal;
  a decoder configured to decode the phase information in the first information signal; and
  a phase compensation unit configured to estimate the phase change of the first information signal caused by the communication channel from the first reference signal and to compensate the decoder for the phase change of the first information signal caused by the communication channel.

20 Claims, 8 Drawing Sheets

(51) Int. Cl.
*H04B 10/61* (2013.01)
*H04J 14/02* (2006.01)
*H04B 10/50* (2013.01)

(58) Field of Classification Search
USPC .... 398/140, 141, 25, 34, 154, 155, 158, 188
See application file for complete search history.

(56) References Cited

U.S. PATENT DOCUMENTS

2013/0251369 A1    9/2013  Ogasahara
2015/0333838 A1*  11/2015  Horikoshi .......... H04B 10/6165
                                                                398/208

OTHER PUBLICATIONS

Hoi-Kwong Lo, et al., "Measurement-Device-Independent Quantum Key Distribution", Physical Review Letters 108 (13), 2012, 5 pages.
Allison Rubenok, et al., "Real-World Two-Photon Interference and Proof-of-Principle Quantum Key Distribution Immune to Detector Attacks", Physical Review Letters 111 (13), 2013, 5 pages.
Hua-Lei Yin, et al., "Measurement-Device-Independent Quantum Key Distribution Over a 404 km Optical Fiber" Physical Review Letters 117 (19), 2016, 5 pages.
L.C. Comandar, et al. "Quantum key distribution without detector vulnerabilities using optically seeded lasers", Nature Photonics 10 (5), 2016, 5 pages.
M. Pittaluga, et al., "A New Approach to extend QKD", 2020, 1 page.
Charles H. Bennett, et al., "Quantum Cryptography: Public Key Distribution and Coin Tossing", Proc. of IEEE Int. Conf. on Comp. Sys. Sign. Process. (IEEE, New York, 1984), 7 pages.
Jiu-Peng CHEN, et al.; "Twin-Field Quantum Key Distribution over 511 km Optical Fiber Linking Two Distant Metropolitans"; arXiv:2102.00433v1 [quant-ph]: Jan. 31, 2021; Downloaded from https://arxiv.org/pdf/2102.0433.pdf on August 3. 2021; 32 pgs.
Wenyuan WANG, et al.; Simple Method for Asymmetric Twin-Field Quantum Key Distribution; New J. Phys; vol. 22; Jan. 20, 2020; 15 pgs.
Combined Great Britain Office Action and Search Report dated Aug. 5, 2021 in Application No. GB2104518.2; 6 pgs.
Jurij Tratnik et al.; "Fiber Interferometric Communications Using Mach-Zehnder Interferometer Topology"; IEEE Eurocon 2009; May 18, 2009; 6 pgs.

* cited by examiner

OPTICAL SYSTEM AND METHOD

CROSS-REFERENCE TO RELATED APPLICATIONS

This application is based upon and claims the benefit of priority from prior United Kingdom Application number 2020609.0 filed on 24 Dec. 2020, the entire contents of which are incorporated herein by reference.

FIELD

Embodiments relate generally to an optical system and method, a quantum communication system, an interferometry system, and a method of reducing optical phase noise.

BACKGROUND

In optical systems, information may be stored in the phase of an optical signal. Such an optical signal is transmitted between distant nodes using an optical channel. The optical channel may introduce phase drift, which contributes to phase noise.

In a quantum communication system, information is sent between a transmitter and a receiver by encoded single quanta, such as single photons. A bit of information can be encoded upon a property of the photon, such as its polarization, phase, time or energy.

Quantum key distribution (QKD) is a technique that results in the sharing of cryptographic keys between two parties: a transmitter often referred to as "Alice"; and a receiver often referred to as "Bob". The attraction of this technique is that it allows to quantify the maximum information potentially known to an unauthorised eavesdropper, often referred to as "Eve". In many forms of QKD, Alice and Bob use two or more non-orthogonal bases in which to encode the bit values. These bases are kept secret during the quantum communication and are disclosed in a public discussion only after all the measurements have been completed by Bob. The laws of quantum mechanics dictate that measurement of the photons by Eve without prior knowledge of the encoding basis causes an unavoidable change to the quantum state of some of the photons. This will cause errors in the bit values sent between Alice and Bob. By comparing a part of their common bit string, Alice and Bob can thus determine the potential information gained by Eve. Some QKD methods require an accurate measurement of the phase of the photon received at the detector.

In addition to QKD, there are other applications where it is desirable to perform an accurate measurement of the phase such as in optical interferometry.

BRIEF DESCRIPTION OF THE FIGURES

FIG. 4A represents the interference outcome in free drift and step 1;

FIG. 4B shows the phase drift rate for free drift and step 1;

FIG. 4C represents the interference outcome when step 1 stabilisation is applied and then also step 2 stabilisation is applied;

FIG. 4D shows the normalised distribution of the date in FIG. 4C;

DETAILED DESCRIPTION

Figure 1:
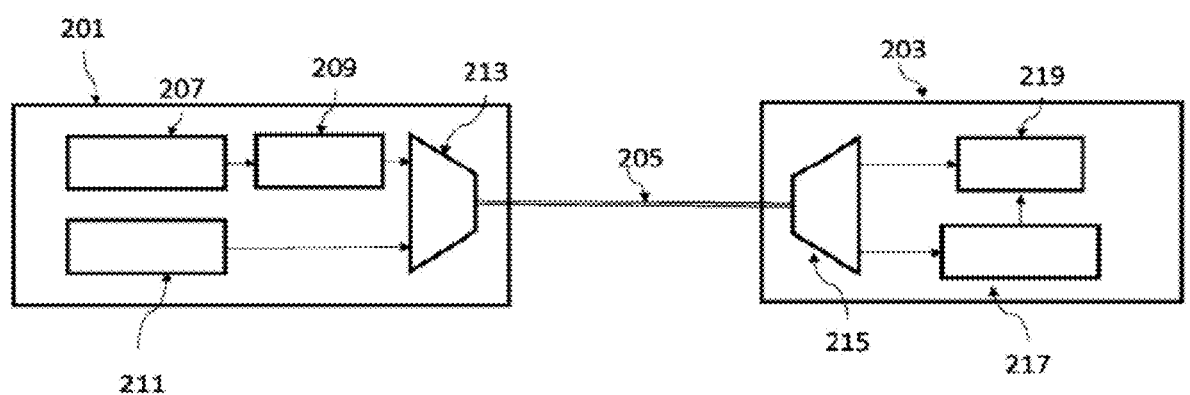
FIG. 1 is a schematic of an optical network in accordance with an embodiment.

In an embodiment, an optical system is provided comprising a first emitter and a receiver,
said emitter comprising an encoding unit configured to encode information using phase on a first optical information signal, said first information signal having a single first wavelength, said emitter being configured to output a reference signal, said reference signal having a different wavelength to the first wavelength, the emitter further comprising a multiplexer configured to multiplex the first information signal and the reference signal to produce a multiplexed first signal and output the multiplexed first signal to a communication channel
said receiver comprising:
a de-multiplexer configured to de-multiplex the multiplexed first signal received from the emitter to extract the first information signal and the reference signal;
a decoder configured to decode the phase information in the first information signal; and
a phase stabilisation element configured to estimate the phase change of the first information signal caused by the communication channel from the first reference signal and to compensate the decoder for the phase change of the first information signal caused by the communication channel.

The above network can be part of a quantum key distribution network. The phase sensitive quantum communication protocols such as TF-QKD, DLCZ-type quantum repeaters and quantum fingerprinting can be used with the above. However, the above optical network can also be used in interferometry. For example, astronomical interferometry where it is required to remove the phase noise of channels connecting different telescopes. The above network uses a dual-band stabilisation scheme based on wavelength division multiplexing. By using a reference signal that has a different wavelength to the information signals, it is possible to avoid noise due to Rayleigh scattering that would be caused if the reference signal had the same wavelength as the information signals. Also, sending the reference signals and the information signals with the same wavelength would require time division multiplexing that would reduce the bit rate of the information signal.

In an embodiment, the first wavelength and the reference wavelength have a difference of 4% or less. Keeping the first wavelength and the reference wavelength close means that the phase correction required by the two wavelengths to compensate for a certain channel length fluctuation will be similar. For this reason, the compensation of the phase noise experienced by the reference wavelengths will, in turn, greatly reduce the phase noise experienced by the first wavelength. In a further embodiment, the difference between the first wavelength and the reference wavelength is 1% or less, in other embodiments, 0.1% or less.

In a further embodiment, the network further comprises:
  a second emitter, wherein said second emitter comprises an encoding unit configured to encode information using phase on a second optical information signal, said second information signal having a single first wavelength, said emitter being configured to output a second reference signal, said second reference signal having the same wavelength as the first reference signal, the emitter further comprising a multiplexer configured to multiplex the second information signal and the second reference signal to produce a multiplexed second signal and output the multiplexed second signal to a communication channel,
  and wherein the decoder is configured to decode the phase information in the first and second information signals; and
  the phase compensation element configured to estimate the phase change of the first and second information signals caused by the communication channel from the first and second reference signals.

In the above, the phase stabilisation/compensation element estimates the phase offset between the phase reference frames of the information signals (through the information retrieved from the reference signals). This information is used to interpret correctly the interference occurring between the information signals.

The above is an example of the principles applied to a three node network where the first emitter is a first node, the second emitter is a second node and the receiver is in a third node. Such a network can be used in twin field QKD "TF-QKD" where the first and second emitters both send signals to the receiver and the receiver performs first order optical interference between the signals from the first and second emitters. By disclosing the results of the interference, it is possible for the two emitters to establish a secret key.

For a quantum network, the emitters further comprise an attenuator configured to attenuate the first information signal leaving the emitter into a series of weak light pulses, where the phase encoded pulses have an average intensity of less than one photon and the first reference signal has a signal intensity that is greater than the average intensity of the photon pulses.

The phase compensation can be active or passive. In active phase compensation, a feed-back element is provided to correct the phase of the photons prior to measurement, for example, interference. In a passive system, a correction is performed after the measurement has been made.

In an active system, the feedback element may comprise a phase modulator, for example an electro-optic phase modulator. An electro-optic phase modulator allows fast correction of the phase drift. Also, since the phase modulator is only correcting of the phase, it can exploit the 2 π periodicity of the optical phase. The 2 π periodicity of the optical phase allows to use a single phase modulator that only covers the [−π, +π] phase range to correct for possible phase offset in the channels.

The phase modulator can be controlled by a signal derived from the interference of the received first and second reference signals.

In an embodiment, the active compensation comprises a first stage and a second stage, the first stage comprising the feed-back element that compensates the phase using information from the reference signal and a second stage comprising a feed-back element compensating the phase using information from signals sent with the first wavelength. In an embodiment, further reference signals are sent with the first wavelength to provide information for the second stage. The second stage provides a fine tuning of the phase correction performed in the first stage. The further reference signals sent with the first wavelength can be viewed as a "dim reference". The feedback element of the second stage may comprises a fiber stretcher.

An optical network wherein the first stage comprises a phase modulator and the second stage comprises a fiber stretcher. A fibre stretcher has lower loss than an electro-optic modulator. However, a fibre stretcher is slower, but this does not matter if the fibre stretcher is just being used for fine tuning. It should be noted that an electro-optic modulator could also be used for the second stage.

In an embodiment, the phase modulator is provided in the detection unit.

In a further embodiment, the decoder of the optical network comprises an interference element configured to interfere the first and second reference signals and the first and second information signals, the output of the interference element being selectively directed towards at least one detector, the presence or absence of a signal being received at the at least one detector due to the interference of the first and second information signals providing a bit stream and a quantum key being formed from the bit stream.

The detector signal (or detector "clicks") can be used by the phase compensation unit. For example, the phase compensation unit may be configured to integrate the received signals from the detector due to the interference of the first and second reference signals and determine phase offset information from the interference of the received first and second reference signals at the reference wavelength.

The phase compensation may be provided by a post processor, said post processor being configured to select, ignore or reverse bits of the bit stream dependent on the derived phase offset information.

The phase stabilisation element may provide active stabilisation by compensating the phase of the information signals prior to interference, a control signal for the active phase stabilisation being dependent on the derived phase offset information.

The first emitter and the second emitter may each comprise a laser configured to generate the information signals at the first wavelength. A phase-locked-loop may be configured to lock the laser of the first emitter with the laser of the second emitter. In alternate embodiments a single laser provides the input for both emitters, this may be located within one of the emitters or outside both emitters.

As noted above, the optical system may be configured as a quantum communication system which is configured to distribute a key between the first sending unit and the second sending unit.

The optical system may also be configured as an interferometry system which is configured to interfere the received first and second signals of interest at the detection unit.

In a further embodiment, an optical method is provided comprising:

encoding information using phase on a first optical information signal, said first information signal having a single first wavelength, outputting a reference signal, said reference signal having a reference wavelength which is different to the first wavelength, multiplexing the first information signal and the reference signal to produce a multiplexed first signal and output the multiplexed first signal to a communication channel estimate the phase change of the first information signal caused by the communication channel from the first reference signal; and decoding the phase information in the first information signal, wherein the decoding is compensated for the phase change of the first information signal caused by the communication channel.

FIG. 1 is a schematic of a very simple communication network to demonstrate the basic principles. FIG. 1 shows an emitter 201 connected to a receiver 203 by a communication channel 205.

In this embodiment, the emitter comprises a light source 207 which emits an optical signal of a single wavelength $\lambda_1$ to an encoder 209. In this embodiment, the light source is provided within the emitter 201. However, the light source 207 may be provided outside the emitter 201 and a conduit provided within the emitter to guide the light from light source 207 to the encoder 209. Details of possible configurations for the encoder will be described later. However, the encoder provides a phase varying modulation to the signal from the light source 207 to produce a first information signal having a single wavelength $\lambda_1$.

The emitter also comprises a second optical source 211 which emits an optical signal of a single wavelength $\lambda_{REF}$, the first reference signal. $\lambda_1$ and $\lambda_{REF}$ are different to each other. However, in an embodiment, they will be similar in wavelength. The relationship between $\lambda_1$ and $\lambda_{REF}$ will be discussed later.

The first information signal and the first reference signal are then multiplexed together by wavelength division multiplexer 213 to produce first multiplexed signal. First multiplexed signal is then outputted to communication channel 205 which carries the first multiplexed signal to the receiver 203.

The receiver 203 comprises a wavelength division demultiplexer 215 which receives the first multiplexed signal and demultiplexes them to recover the first information signal and the first reference signal. The recovered first information signal is then directed into decoder 219 which decodes the phase information from the first information signal. The recovered first reference signal is then directed into phase control element 217.

The information carried by the first information signal is encoded in phase. As the information signal passes from the emitter 201 to the receiver 203, phase drift (sometimes called phase noise) will occur. Thus, if it is desired to decode the phase at the decoder 219, a correction needs to be made for the phase drift.

This is achieved by the first reference signal which is processed via phase control element 217. Phase control element 217 is then used to provide a correction to the phase decoding.

In some communication networks, such as quantum communication networks, it is necessary to keep the intensity of the first information signal very low. Also, to preserve the security of the network, is it not possible to amplify the first information signal and to therefore use this to correct for the phase drift.

By using a reference signal which does not carry the sensitive information of the first information signal, it is possible to amplify the reference signal and use this to provide feedback to correct for the phase drift in the first information signal. Also, by using a reference signal which has a different wavelength to the information signal, it is possible to wavelength multiplex the information signal and reference signal and thus the rate of information transmitted to the receiver is not reduced by additionally sending the reference signal.

A specific example of the arrangement of FIG. 1 applied to a twin field quantum key distribution "TF-QKD" system will now be described with reference to FIG. 2.

Figure 2:
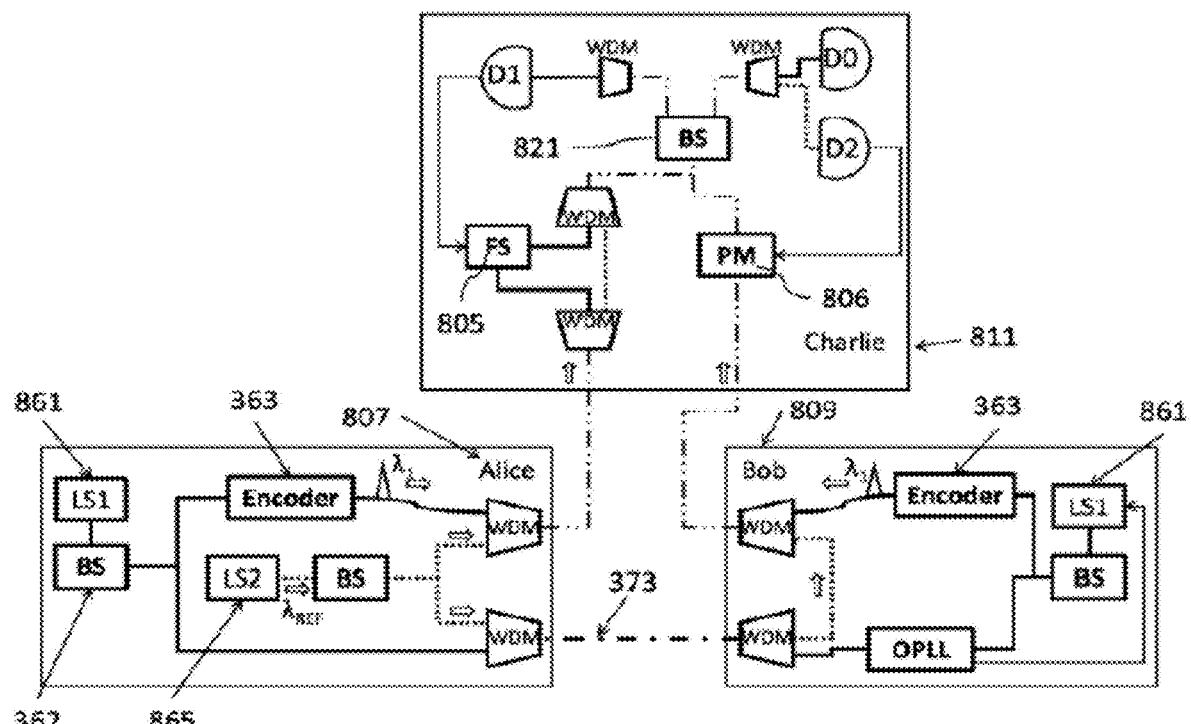
FIG. 2 is a schematic of a QKD network in accordance with an embodiment.

FIG. 2 shows a TF-QKD scheme where Alice and Bob each encode information in the phase of an optical pulse and where phase noise reduction is applied.

In FIG. 2, the expression 'WDM' is used to refer to wavelength division multiplexing and demultiplexing. Multiplexing comprises joining several signals at different signals together such that they may be transmitted over the same optical channel, for example. Demultiplexing comprises separating the joined (multiplexed) signal according to their wavelengths. WDM systems may use WDM couplers. According to an example, WDM couplers (also referred to as WDM modules or wavelength filters) are based on thin-film wavelength filters. A first filter reflects or transmits a selected wavelength and lets all other wavelengths pass. The remaining light is sent onto a second filter, which reflects or transmits a second selected wavelength and lets all other wavelengths pass, and so on. Other types of WDM modules may be based on arrayed waveguide gratings (AWGs). These may be integrated on a chip and use interference to direct light of a selected wavelength into a selected waveguide.

Alice and Bob generate light at a wavelength $\lambda_1$, indicated by solid lines (-) in the figure, using local continuous wave (CW) lasers LS1. Alice's LS1 861 acts as a phase reference. Its light is split in two at a beam splitter BS 362. One part is sent to Bob 809 through a service fibre 373, depicted by a dash-dot-dash line (-.-) and is used to lock Bob's LS1 861 via a heterodyne optical phase-locked loop (OPLL).

Both Alice 807 and Bob 809 send some of the light from their LS1 to an encoder 363. The encoder 363 performs phase and intensity modulation to output phase encoded pulses, in order enables different TF-QKD protocols to be run.

Alice 807 further comprises a second laser LS2 that generates the bright reference signal $\lambda_{REF}$. Light from LS2 at a wavelength of $\lambda_{REF}$ (denoted by dot-dot (. .) lines in the figure) is directed to a beam splitter where it is divided in two parts. Part of the bright reference is directed to a multiplexer where it is multiplexed with pulses from LS1 at a wavelength of $\lambda_1$. The multiplexed light, denoted by dash-dot-dot (-. . .-) in the figure, is then sent to Charlie via an optical channel (also referred to as a quantum channel). The other part of the bright reference is directed to a multiplexer that combines it with the light from LS1 from beam splitter 362. The multiplexed light from LS1 and LS2 is directed to Bob via service fibre 373.

At Bob 809, light from the service fibre 373 is directed to demultiplexer where the light from LS1 at $\lambda 1$ is separated from the bright reference at $\lambda_{REF}$. Light at $\lambda 1$ from Alice is directed to the OPLL which locks Bob's LS1 to Alice's LS1. Bright reference light at $\lambda_{REF}$ is directed to another multiplexer, where it is multiplexed with pulses from Bob's encoder 363, and then sent to Charlie via a quantum channel.

At Charlie 811, light received from Bob is passed through a phase modulator (PM) 806 and then sent to beam splitter 821. PM 806 acts on both the quantum signal and the bright reference signal and may adjust the phase of the signals. PM 806 implements a fast feedback system which will be described below with reference to FIG. 3A.

Light received from Alice is passed through a demultiplexer to separate the quantum signal from the bright reference signal. The bright reference is then directed to a multiplexer while the quantum signal is passed through a fibre stretcher (FS) 805, which may adjust the phase of the signal. The FS 805 implements a slow feedback system that will be described below with reference to FIG. 3B. The quantum signal is then recombined with the reference signal in a multiplexer and directed to beam splitter 821.

At beam splitter 821, light from Alice and Bob interfere. The output of the interference is directed to two demultiplexers where the interference outcome of the quantum signal (at $\lambda_1$) is separated from the interference outcome of the reference signal (at $\lambda_{REF}$). At one demultiplexer, the interference outcome at $\lambda_1$ is monitored by detector D0, and the interference outcome at $\lambda_{REF}$ is monitored of detector D2. The output of D2 is directed to PM 806 to implement fast feedback, as will be described below. D0 provides the output of Charlie. At another demultiplexer, the interference outcome at $\lambda_1$ is separated and then directed to detector D1 for monitoring. The output of D1 is directed to FS 805 to implement slow feedback, as will be described below.

The output at detector D0 may be output by Charlie according to a TF-QKD scheme. In a Twin field QKD (TF-QKD) scheme information is encoded in the electromagnetic phase of a photon. It is desired for Alice and Bob to exchange a key. Alice 807 and Bob 809 transmit to trusted quantum receiver 811. TF-QKD has been developed for the situation where the security of the measurement devices owned by Bob might be in doubt. In TF-QKD, the user Bob 809 is configured as an optical transmitter, similarly to the other user Alice 807. The two optical transmitters Alice 807 and Bob 809 send light pulses to a relay station, usually called "Charlie", which optically couples and measure them. Alice and Bob can distil a secret key from the publicly announced results of Charlie's counts. In TF-QKD the users Alice and Bob are both configured as optical transmitters, therefore the security is not threatened by the vulnerabilities of the optical receiver. Protecting optical transmitters is far easier than protecting optical receivers. In the former case, the optical pulses are prepared locally by a trusted user, whereas in the latter they are received from the outside, prepared by someone who is untrusted and possibly interested in breaking the security of the system. It is worth noticing that if Charlie is evil and does not comply with the correct execution of the TF-QKD protocol, the two honest users Alice and Bob can always detect his attempt at cheating with very high probability by the laws of quantum mechanics.

In this simplified scenario, a common fixed phase reference $\varphi_R$ is available to all the users all the time. As the phase reference is common to everybody and constant, it can be assumed without loss of generality that $\varphi_R = 0$. Alice 807 has a phase locked light source 861 and a phase modulator 363. The phase locked light source 861 generates optical pulses with constant phase, and outputs them to the phase modulator 363. The output of the phase modulator 363 is then multiplexed with the reference signal by WDM as explained above.

Bob's transmitter 809 is configured in the same manner as Alice's 807 and to avoid any unnecessary repetition like reference numerals will be used to denote like features.

Alice prepares a first light pulse using her light source 861 to produce a pulse and then encodes her secret information in the electromagnetic phase difference between the light pulse and the phase reference $\varphi_R$ using phase modulator 363. In this particular example, the encoding of the BB84 protocol [C. H. Bennett and G. Brassard, *Proc. of IEEE Int. Conf. on Comp. Sys. Sign. Process.* (IEEE, New York, 1984), pp. 175-179] is considered, where Alice encodes a random "basis", either Z or X, by selecting a phase value $\alpha_A = 0$ or $\alpha_A = \pi/2$, respectively, and a random "bit", either 0 or 1, by selecting a phase value $\beta_A = 0$ or $\beta_A = \pi$, respectively.

The optical pulse prepared by Alice will then carry a total electromagnetic phase $\alpha_A + \beta_A$. Then Alice moves to the next pulse and repeats the procedure. Bob performs similar steps with phases $\alpha_B$ and $\beta_B$. The total electromagnetic phases of the pulses exiting Alice and Bob's modules are indicated by $\varphi_A$ and $\varphi_B$ respectively:

$$\text{Alice: } \varphi_A = \alpha_A + \beta_A \quad (1)$$

$$\text{Bob: } \varphi_B = \alpha_B + \beta_B \quad (2)$$

Since all the phases are stable, Alice 807 and Bob's 809 phase values remain constant during the propagation through the communication channels. When the optical pulses reach Charlie's non-polarising beam splitter, they undergo a so-called "1$^{st}$-order interference", which is of the same kind as the one seen in a double-slit interference experiment and in standard QKD. This means that in order to interfere deterministically, the phases of Alice and Bob's pulses should satisfy the following interference condition:

$$\varphi_B - \varphi_A = 0 \bmod \pi, \quad (3)$$

where "mod $\pi$" means "addition modulo $\pi$". As the phase values associated to the bits are either 0 or $\pi$, Eq. (3) reduces in this case to the following condition about the matching condition of the bases:

$$\alpha_B - \alpha_A = 0. \quad (4)$$

If this condition is satisfied, then when $$\beta_B - \beta_A = 0, \quad (5)$$

the light emerges from the port connected to detector 0, whereas when $$\beta_B - \beta_A = \pi, \quad (6)$$

the light emerges from the port connected to detector. Therefore, after Charlie announces his counts and after Alice and Bob announce their bases, Alice and Bob can reconstruct the bit value prepared by the other user in all cases where the bases match. In case of non-matching bases, the users discard the data, as in the standard BB84 protocol. In an embodiment, Charlie announces all the instances where exactly 1 of his detectors clicked. For these instances he also announces which detector clicked.

Another possibility is that Charlie announces also when both his detectors clicked. These double clicks are useless for the final key and can be treated in two ways:

1) Alice and Bob discard the runs where Charlie announced the double clicks;

2) Alice and Bob transform a double click into a single click by deciding at random which of Charlie's detectors clicked.

The security is the same in both cases. In an example D0 and D1 are single photon detectors.

According to an example, D0 and D1 are superconducting nanowire single photon detectors (SNSPDs). According to a further example, the SNSPDs are Single Quantum EOS 410 CS cooled at 2.9 K.

In an example, detector D2 is the same as D0 or D1. Alternatively, D2 is a photodiode detector.

Note that to compensate for the different expansion/contraction rates and changes in length of the quantum channels connecting Charlie to the two users, Alice and Bob, the pattern encoding of one user with respect to the other may be delayed by an experimentally determined amount, such that the pulses arriving at Charlie's BS 821 are time-aligned. The amount of delay may be tuned at regular intervals to maintain time alignment. In an example, the amount of delay is tuned between once every 4 minutes, up to once every of 30 minutes.

Phase stabilisation may use the count rate of detector D1 of dim references or D2 of bright references as feedback signals.

With short integration intervals, the counts detected by D1 or D2 can be written as:

$$C = C_0 + C_1(1 - \cos \Delta\vartheta), \quad (7)$$

where $C_0$ represents the count floor, while $C_1$ is the amplitude of the interference between the reference pulses, and $\Delta\vartheta$ is the phase difference which drifts rapidly due to phase noise from the channel. For the feedback provided by D2, $C_0 \approx 0$, while $C_1$ is the count rate of the reference signals (at $\lambda_{REF}$) prepared by Alice 807 and Bob 809. For the feedback provided by D1, $C_0$ is the count rate associated with the phase encoded pulses sent over $\lambda_1$, while $C_1$ is the count rate of the dim reference signals (phase unmodulated) sent by Alice 807 and Bob 809 over $\lambda_1$. For the feedback provided by D1, $C_0 \approx C_1$ when the intensity and probability (of occurrence) of the phase encoded pulses and reference pulses are equal. The locking point for the stabilisation may be chosen to be at the quadrature point ($\Delta\vartheta = \pi/2$). Near the locking point of $\Delta\vartheta = \pi/2$, the count rate is approximately a linear function of the phase drift and therefore allows improved phase compensation.

The locking point is obtained by varying the DC bias of the PM 806 or FS 805 such that the phase drift can be counteracted and a constant count rate of $C_0 + C_1$ can be maintained. The phase compensation is provided by PID controllers that receive as input the number of photons collected by the photon counter connected to detectors D2 or D1 and that modify the PM's or FS's DC offset through its amplified 12-bit DAC. In an example, the PM's DC offset is corrected every 5 us, while the FS's DC offset is corrected every 10-100 ms.

Figure 3A:
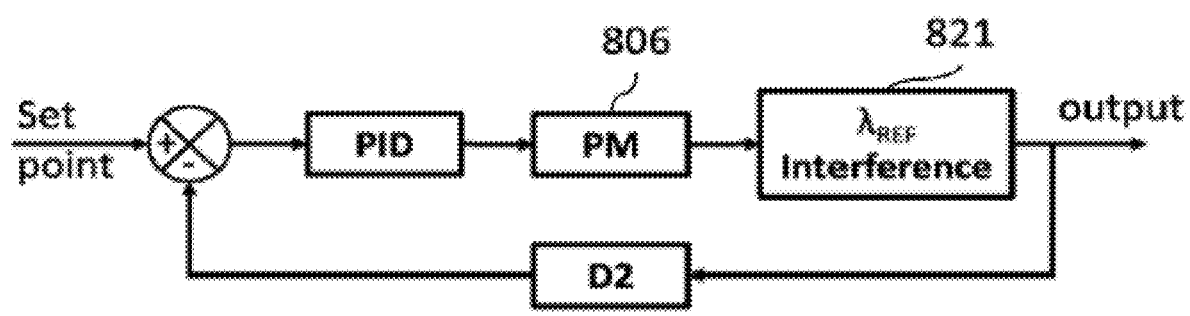
FIG. 3A is a schematic of a fast feedback component to be used in the network of FIG. 2.

FIG. 3A is a schematic of the fast feedback strategy described above to enable stabilising the quantum channel without affecting the encoding in the wavelength reserved for the quantum signal ($\lambda_1$) or the clock rate at which quantum signal pulses may be encoded. In an example, the clock rate is set at 500 MHz.

FIG. 3A shows a schematic of the fast feedback system. The fast feedback system is configured to stabilise fast drift introduced by the optical channel. The fast feedback system is configured to provide a fast error signal that can in turn be used to stabilise the fast drift. The stabilisation method comprises monitoring the interference of the bright reference at a wavelength $\lambda_{REF}$. From the interference of the bright pulse, a signal (i.e. an error signal) is derived and used to adjust the phase shift applied by the PM 806. The fast feedback system may provide near-instantaneous correction of the phase drift. For example, in an embodiment, fast feedback is fast enough to be capable of correcting phase drifts arising over the communication channels. In the case of optical fibres for example, already over short distances (tens of kilometres) the phase drifts are in the order of tens of radians per millisecond.

The bright reference signal provides a bright optical signal that enables the feedback system to operate at a fast rate. The bright reference signal ($\lambda_{REF}$) may be brighter than the signals of interest ($\lambda_1$) because they are transmitted at a different wavelengths.

The fast feedback system comprises a closed loop cycle that locks the interference between Alice's and Bob's bright reference beams to a given intensity level. This, in turn, locks the phase offset between these signals to a fixed value. The bright reference interference is monitored by the detector D2.

In an example, the bright reference comprises single photons, which are detected by D2 are integrated over a time period. In an example, the time period is 5 ρs. The intensity value of the bright signal can take value within a range defined by a maximum and a minimum level. The minimum level is the minimum intensity that the reference has to have in order to provide an error signal fast enough to correct for the channel phase drift. The maximum level is the maximum intensity that the reference signal can have before it introduces too much error on the signal of interest (or quantum signal). If the intensity of the reference signal is too high, effects such as inelastic scattering along the communication channel (Raman scattering), or limited optical isolation of the WDMs, will leak noise photons into wavelength of the signal of interest, which is a problem.

As noted above, Detector D2 doesn't have to be a single photon detector. It could well be a photodiode. In that case, since photodiodes requires more light to provide useful information, the operator will have to test that the reference signal does not introduce too much noise on the signal wavelength.

Also in the case of the integration time, that will depend on the application. Mostly on the magnitude of phase noise that has to be corrected. But since the phase drifts introduced by a long communication channels are in the orders of tens of rad per second, the integration time for the information used by the quantum feedback will have to be in the range of few (tens of) microseconds, to hundreds of nanoseconds.

The difference between the integrated number of counts and the set value, constitutes the error signal of a PID controller. In an example, the PID controller is an FPGA clocked at 200 kHz. By tuning the DC offset of the phase modulator (PM) 806 that acts on the light coming from Bob, the FPGA controls the interference between the bright references.

Note that the phase shift applied by the PM affects both the wavelengths $\lambda_{REF}$ and $\lambda_1$. According to an example, the feedback based on $\lambda_{REF}$ fully stabilises the bright reference light while it only partially stabilises the quantum signal at $\lambda_1$.

The remaining (slow) phase drift on $\lambda_1$ is related to two factors: (i) $\lambda_1$ and $\lambda_{REF}$ may travel separately in certain sections of the network, and (ii) the fast feedback introduces a phase drift over $\lambda_1$ when the path length difference seen by $\lambda_1$ and $\lambda_{REF}$ varies over time. The former component of the slow phase drift can be seen as the phase noise picked up by an asymmetric Mach-Zehnder interferometer having the dimensions of those sections of the network where the two wavelengths travel separately. The latter component can be explained as a consequence of the finite range of the PM, and of the phase locking of the fast feedback over $\lambda_{REF}$, rather than $\lambda_1$.

The PM 806 in the fast feedback actively compensates the fast phase drift. However, its finite adjustment range may not compensate the entirety of the phase drift caused by fibre length variation. It relies on multiple (M) resets in order to maintain the $\lambda_{REF}$ phase difference to $\phi=2\pi M+\phi_t$, where $\phi_t$ is the target phase. Due to the $\lambda_{REF}-\lambda_1$ wavelength difference, this compensation will introduce a residual phase drift ($\Delta\phi$) over $\lambda_1$ equal to: $\Delta\phi=2\pi M\times(\lambda_{REF}-\lambda_1)/\lambda_1$.

The residual drift introduced by the $\lambda_{REF}$-stabilisation over $\lambda_1$ is estimated to be $\phi/\Delta\phi=\lambda_1/(\lambda_{REF}-\lambda_1)$ 1000 times smaller than the original fibre phase drift, if assuming unidirectional fibre length drift. In practice, the fibre length drift direction is random. With cancellation of positive and negative $2\pi$ resets, a substantially higher reduction factor of may be obtained experimentally (see in FIG. 4A).

Figure 3B:
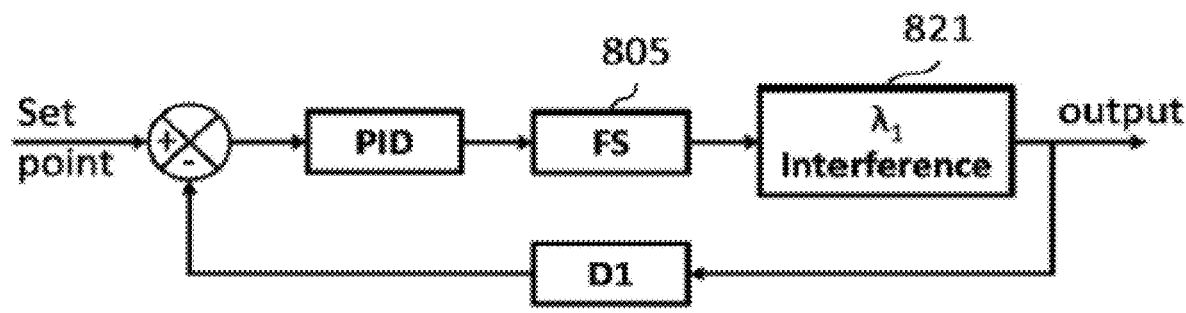
FIG. 3B is a schematic of a slow feedback component to be used in the network of FIG. 2.

FIG. 3B shows the phase compensation scheme acting on the residual phase drift on $\lambda_1$. The phase compensation scheme of FIG. 3B is also referred to as the slow feedback system. The error signal is obtained from the interference of the quantum signals at $\lambda_1$ and obtained from the detector D1. The difference between this value and a set value provides the error signal for a PID controller implemented with a micro-controller. The micro-controller corrects the phase offset by modulating a fibre stretcher (FS) 805 acting on the quantum signal coming from Alice. Unlike the stabilisation of FIG. 3A which acts on both $\lambda_{REF}$ and $\lambda_1$, the slow feedback in FIG. 3B acts solely on the quantum signals ($\lambda_1$) and can therefore correct its residual phase drift. In this example, a fibre stretcher can be used. However, other types of phase modulator could be used for this task for example, electro-optic modulators (EOM), free space optical delays, etc. In the above example a fibre stretcher is used because this is introduces less optical attenuation than other type of phase modulators.

Note that for the slow feedback system of FIG. 3B, the quantum signal at $\lambda_1$ comprises pulses encoded with information as well as dim reference pulses. The dim reference pulses may be interleaved with the information encoded pulses. In an example, the dim reference pulses have the same intensity as the brightest information carrying pulse. The presence of the dim reference pulses provides an interference output that is related to the residual phase offset in $\lambda_1$. The interference output is retrieved by integrating the single photons detected by D1 over a time period. In an example, the time period is 50 ms or 100 ms, depending on the distance of the optical channel. The difference between this value and a set value provides the error signal for a PID controller implemented with a micro-controller operating at the frequency of 20 Hz or 10 Hz, depending on the distance of the optical channel.

According to an example, the phase modulator 806 is an electro-optic modulator, wherein the refractive index of the material is a function of applied electric field. Changes in refractive index result in changes in optical path length and results in changes in the phase shift applied by phase modulator. Different voltages are applied to the phase modulator so as to impart a different phase shift. The phase modulator such as described can comprise a crystal, such as a lithium niobate (LiNbO3) crystal, in which the refractive index is a function of electric field strength, and an electric field may be applied by applying a voltage to electrodes positioned around the LiNbO3 crystal.

The relative phase shift imparted by the phase modulator is set by the PID controller described in relation to FIG. 3A which may be configured to apply a voltage control signal to the phase modulator 806.

Note that the phase modulator provided in the encoder 363 may be similar to the phase modulator 806 described above. Alternatively, the adjustment of the phase shift can be achieved through either tuning the DC bias in the phase modulator in the encoder 363, or adding a DC offset to the driving signal applied to the phase modulator in encoder 363.

In an embodiment, the phase modulator has a high operation bandwidth. For example, a which uses the electro-optic effect (maximum bandwidth in the order of GHz). Other types of modulators with high operation bandwidth are Acousto-optic modulators. These use the acousto-optic effect for the phase correction, and have maximum operation bandwidths in the order of hundreds of MHz, fast enough for the fast feedback.

Figure 3C:
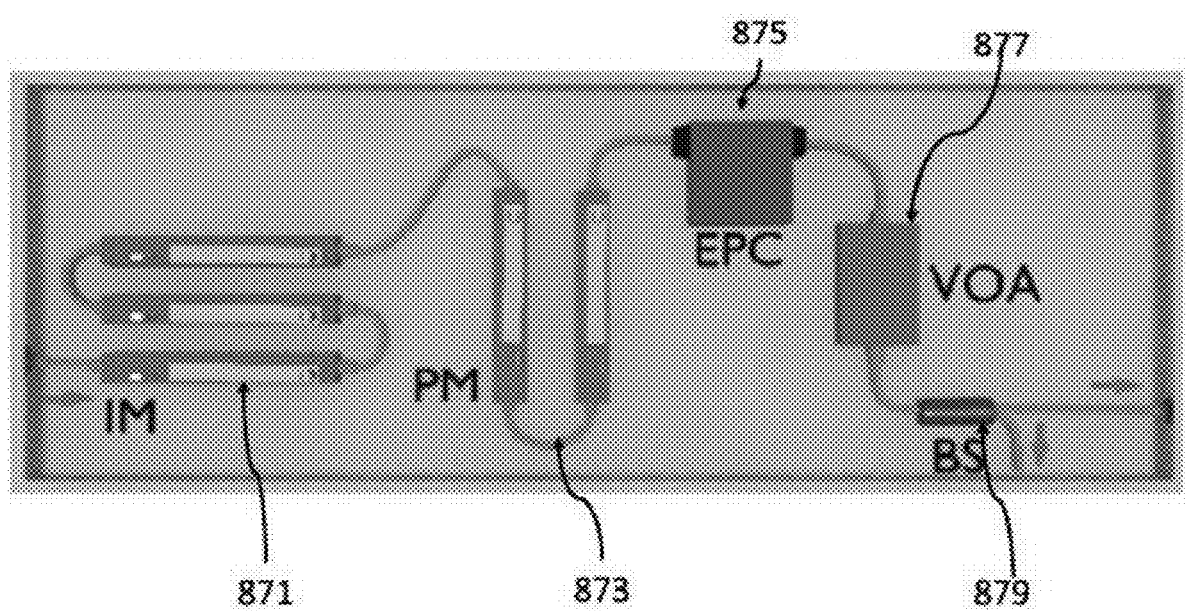
FIG. 3C is a schematic of the encoder used in FIG. 2.

An example of an encoder which may be used in the system of FIG. 2 will be explained with reference to FIG. 3C. The incoming CW light arrives already aligned in polarisation with the optical axes of the subsequent modulators 871. The first components in the encoders are three intensity modulators (IMs) 871, used to carve 250 ps long pulses at a 1 GHz rate, with three possible intensity levels (u, v, w) to allow the use of so-called decoy state protocols. The intensity ratios between the different intensity levels can be adjusted by the AC amplitude driving the IMs.

Two phase modulators (PMs) 873 are then used to encode the phase of the optical pulses. In this system, two PMs are cascaded instead of using just one to reduce their RF signal amplitudes. By limiting each PM to a modulation range of $[-\pi/2, \pi/2]$ it is possible to achieve a phase modulation that covers the whole $[0, 2\pi)$ range and that is linear with its driving signals amplitude. Each PM is driven by a 8-bit DACs, and with two cascaded we are able to encode 512 different phase values over the $2\pi$ phase range.

All the modulators are driven by two synchronised 12 GSa/s waveform generators, one for each user, programmed to encode a 25040-pulse long pseudo-random pattern.

The PMs are followed by an electrically driven polarisation controller (EPC) 875, a variable optical attenuator (VOA) 877, and a 99:1 beam splitter (BS) 879. The EPC is used to control the polarisation of the $\lambda_1$ photons after transmission through the channel. Each user has a continuous polarisation optimisation routine that aligns the quantum signals along the preferred optical axis at Charlie.

The VOA sets the flux of the quantum signal before injection into the quantum channel, through a flux calibration control loop that continuously adjusts the VOA so as to have a stable optical output, monitored at the strong output of the BS.

According to an example, the fiber stretcher 805 comprises a segment of optical fibre mechanically coupled to a piezoelectric actuator. When a voltage is applied to the piezoelectric actuator causes the mechanically coupled optical fibre to be controllably stretched. The stretching of the fibre changes the path length and imparts a phase shift to light that travels through the segment.

Different from the fast feedback, the slow feedback does not require high operation bandwidth. Thus, mechanical modulators that vary the optical path length are suitable the slow feedback FIGS. 4A, 4B, 4C, 4D show an example of the stabilisation achieved with an active dual-band phase stabilisation system similar to that of FIG. 5. In this example, a single signal of interest $\lambda_1$ is multiplexed with a reference signal at a wavelength of $\lambda_{REF}$. In this example, the signal of interest and the reference signal are transmitted to a receiving node over a 555 km optical channel and the interference outcome at different stages of the active stabilisation process is illustrated. In this example, $\lambda_1$=1550.12 nm and $\lambda_{REF}$=1548.51 nm.

Figure 4A:
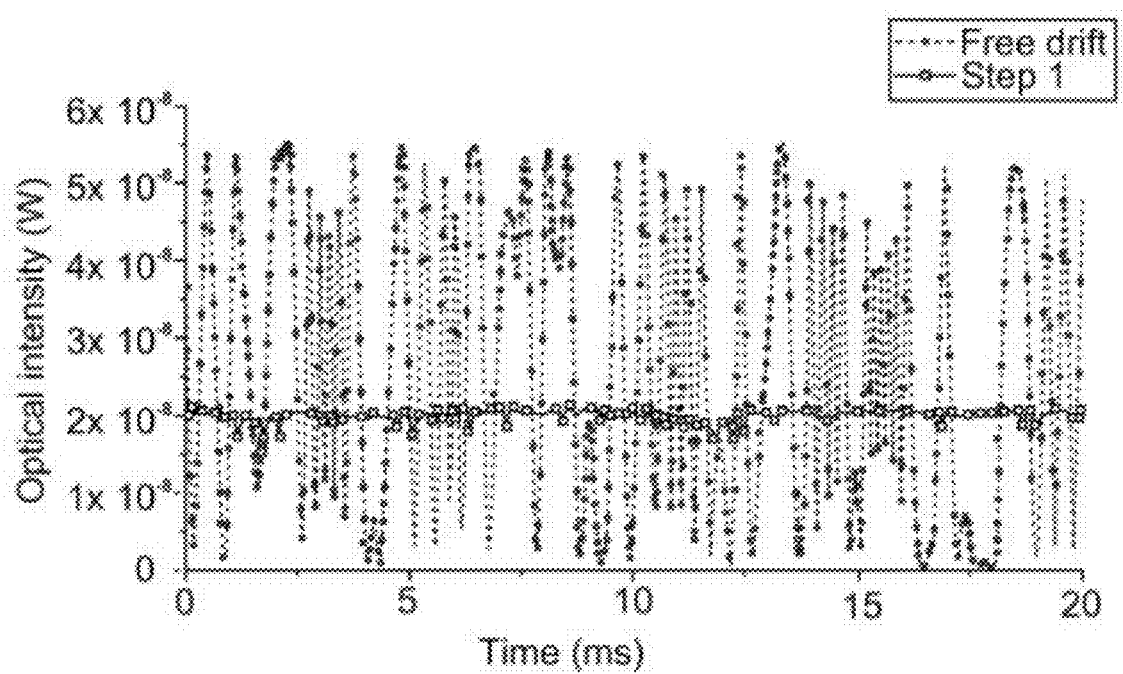
FIGS. 4A, 4B, 4C, 4D show examples of the interference outcome of the signal at $\lambda_i$ at different stabilisation stages, Free drift is when no phase stabilisation is applied on the channel, Step 1: is when the fast feedback is activated. This stabilises completely $\lambda_{REF}$ (not shown here), but leaves a residual slow phase drift on $\lambda_i$. The error signal for the fast feedback is provided by the interference of the two $\lambda_{REF}$ signals, Step 2: is when the slow feedback is turned on in addition to the fast feedback. This stabilises completely $\lambda_i$. The error signal for the slow feedback is provided by the interference outcome of the two $\lambda_i$ signals.
Figure 4B:
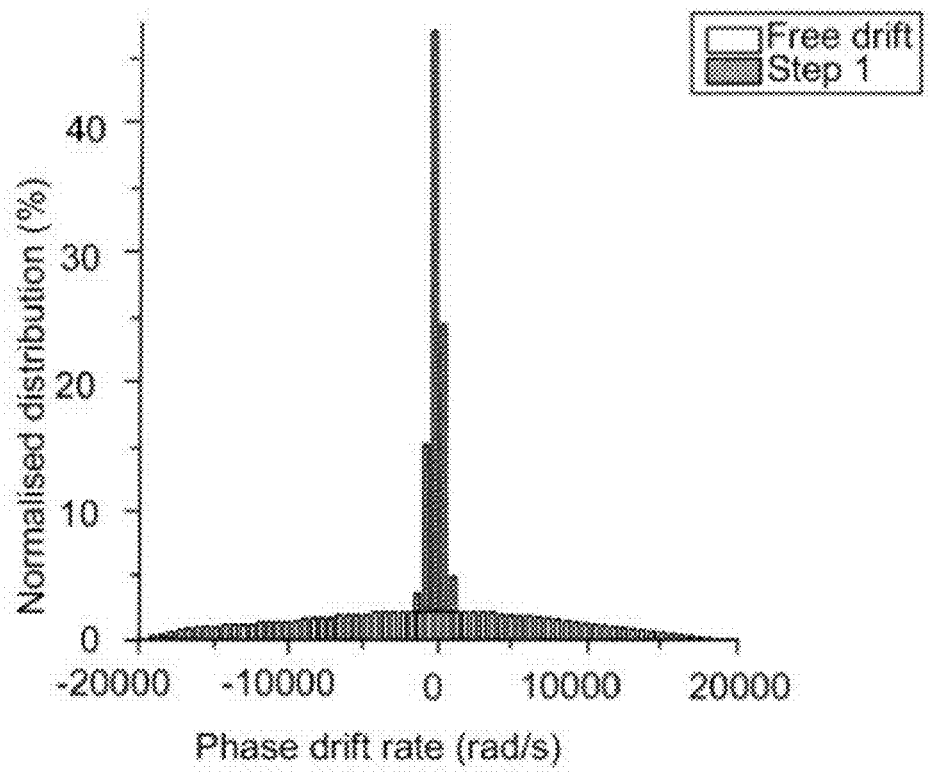
Figure 4C:
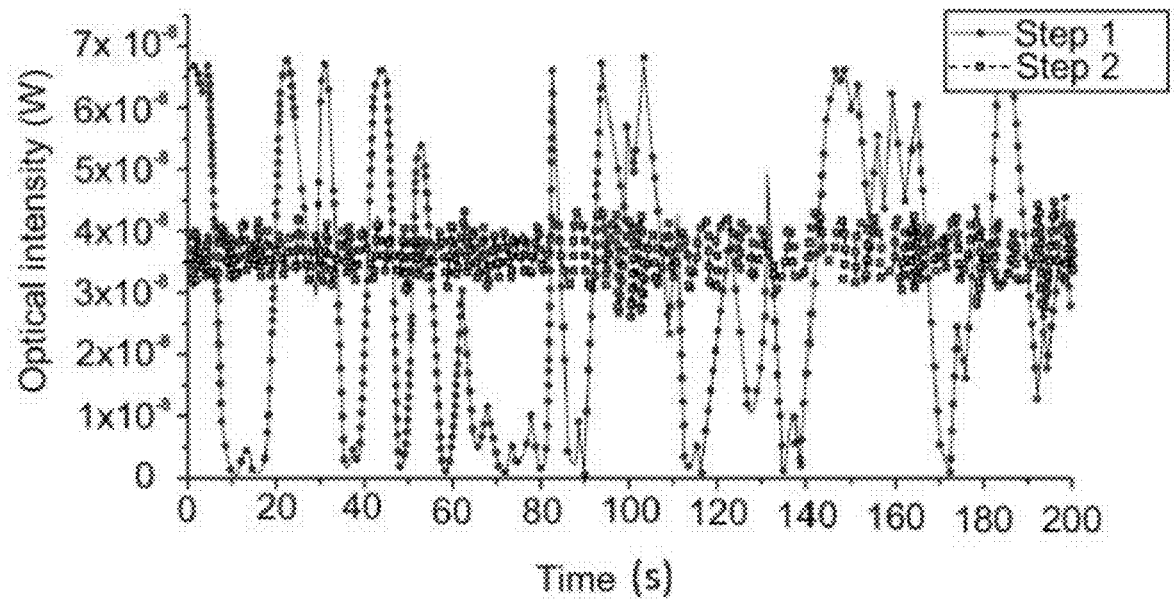

The error signal necessary for the fast phase correction is provided by the interference of a bright reference signal ($\lambda_{REF}$) Note that the results in FIGS. 4A, 4B, 4C, 4D relate to $\lambda_1$ and not $\lambda_{REF}$. The purple dots in FIG. 4A represent the interference outcome when no phase stabilisation is applied. Over the tested distance, the phase drift introduced by the channel is so rapid (of the order of $10^4$ rad/s) that it is possible to discern the optical interference fringes only after zooming into the millisecond time scale. The orange dots in FIGS. 4A and 4C represent the optical interference outcome for $\lambda_1$ when the fast phase feedback is activated. The fast phase feedback reduces drastically the phase drift rate for $\lambda_1$ interference. The fast phase feedback may be implemented in a manner similar to that described in FIG. 2 and FIG. 3A. The effectiveness of this stabilisation is quantifiable by the reduction in the phase drift rate, as shown in FIG. 4B.

Figure 4D:
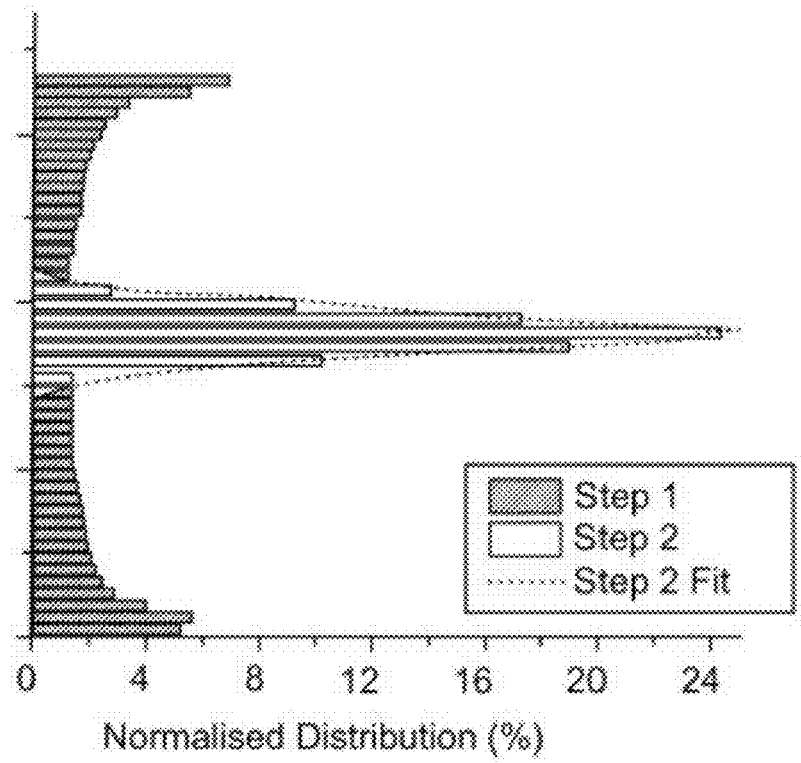

After activating the fast phase feedback, a residual slow phase drift is still present for $\lambda_1$. FIG. 4C illustrates the evolution of constructive or destructive interference over a time scale of tens of seconds. FIG. 4D shows the optical intensity distribution associated to the data in FIG. 4C. The residual slow phase drift can be compensated by the slow phase feedback of the stabilisation system, which acts exclusively on the $\lambda_1$ signals. In the results shown in FIG. 4C and FIG. 4D, the slow phase feedback is implemented in a manner similar to that described in FIG. 2 and FIG. 3B. The $\lambda_1$ signals further compensated by the slow phase feedback is shown in teal colour in FIG. 4C and FIG. 4D.

Figure 5:
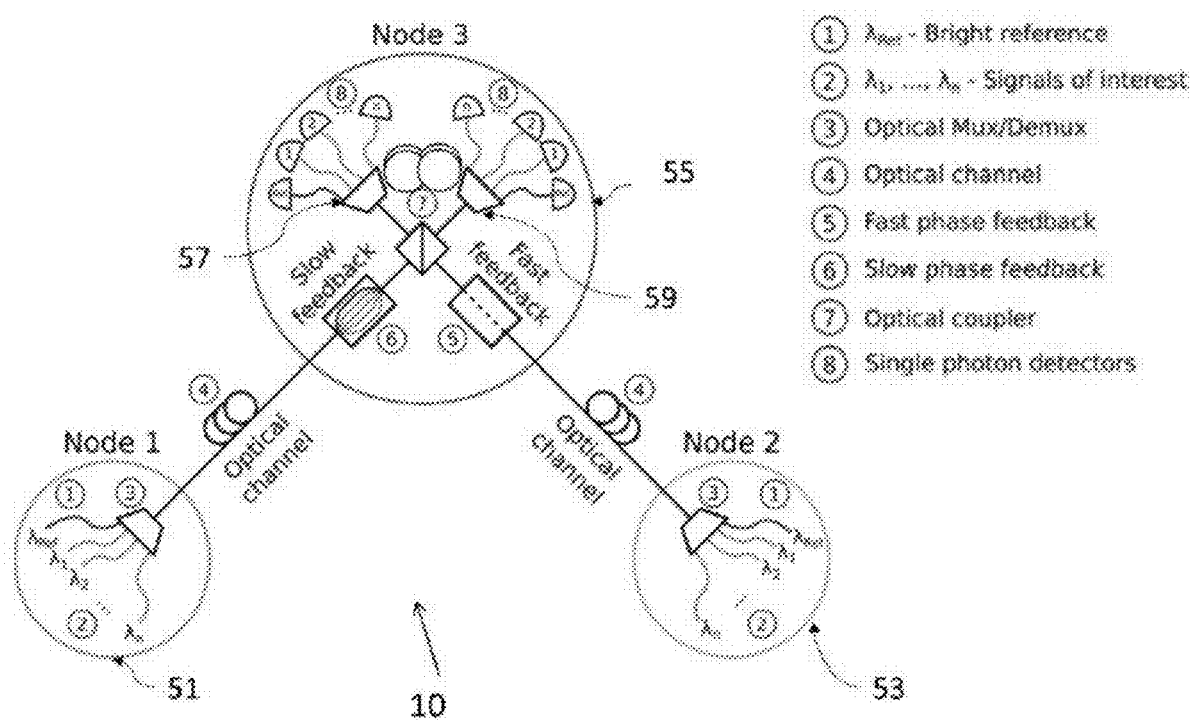
FIG. 5 is a schematic of a 3 node network in accordance with an embodiment with active stabilisation.

FIG. 5 shows a further network in accordance with an embodiment. This network is configured as a three-node network 10. In this network, an active phase compensation will be described.

In the network of FIG. 5, there are two emitter nodes 51 and 53. Each of the emitter nodes 51 and 53 can be configured as the emitter 201 of FIG. 1. In the example of FIG. 1, each emitter node 51 and 53 is shown with a multiplexer 3. In Node 1, there are a plurality of first information signals ($\lambda_1, \lambda_2, \ldots, \lambda_n$) each of which has been separately encoded with phase information. A reference signal $\lambda_{REF}$ is also multiplexed with the information signals. Node 2 is configured in the same manner as node 1.

The network of FIG. 5 is a TF-QKD network of the type described with reference to FIG. 2 and FIG. 3 which allows information to be communication from node 1 to node 2 by node 1 and node 2 encoding information onto an optical signal and sending those signals to a receiver 55 (Node 3). The receiver comprises an optical coupler 7 which causes first order interference between the signals received from node 1 and node 2. Depending on how the signals interfere at the coupler 7, the signals will either be directed towards the first demultiplexer 57 or second demultiplexer 59.

The ability to reduce/eliminate the phase drift introduced by the channel is useful in optical systems where information is stored in the absolute phase of some optical signals, and where, in order to retrieve useful information, it is necessary to reconcile the phase reference frame of the different locations where the phase-encoded signals where generated. Absolute optical phase is a delicate physical quantity that is very susceptible to noise introduced by the transmission medium. Already with a few meters long optical channel, phase drift introduced by the channel starts to affect the optical phase. In an example, phase stabilisation has been demonstrated in a 700 km long optical channel using the system described herein.

In FIG. 5, Node 1 and Node 2 circles represent the locations where the phase sensitive information is sent from, while Node 3 represents the location where the phase sensitive signals (or signals of interests) are combined together through optical interference. Node 1 and Node 2 may be referred to as sending units. Node 3 may be referred to as a detection unit.

The wavelength multiplexing strategy allows the generation of a high intensity contrast between the bright reference and the signals of interest. The wavelength separation also prevents the contamination of the signals of interest with the Rayleigh scattering generated by the bright reference.

In an example, the signals of interest 2 are provided using an arrangement similar to that of encoder 363 described in FIG. 2.

In an example, the bright reference signal 1 is provided using a coherent light source. In a further example, the coherent light source is a laser. In another example, the bright reference signal 1 is provided using the arrangement described above in relation to FIG. 2.

In an example, the wavelength of the bright reference signal 1 and the wavelengths of the signals of interest 2 are spectrally close to one another. According to an example, by the wavelengths being close, it is meant that the any of $\lambda_1$, $\lambda_2, \ldots, \lambda_n$ differs from $\lambda_{REF}$ by a at most 4%. In other embodiments, at most 1% in yet further embodiments, at most 0.01%.

In an example, when $\lambda_1$=1550 nm, $\lambda_{REF}$ is within 1 nm of $\lambda_1$.

In another example, $\lambda_1$=1550.12 nm and $\lambda_{REF}$=1548.51 nm.

The maximum degree of separation between $\lambda_{Ref}$ and $\lambda_i$ depends on the maximum speed at with the slow feedback can be run. The wavelength difference is associated to the residual phase drift to be corrected by the slow feedback. The larger the wavelength difference, the faster will be the residual phase drift, and hence the correction that will have to be applied by the slow feedback. The phase drift reduction factor provided by the fast feedback on $\lambda_i$ is approximately related to $\lambda_i/(\lambda_{REF}-\lambda_i)$.

In the network of FIG. 5, active stabilisation is implemented to compensate for phase noise. When active stabilisation is employed, the different wavelengths in the system do not need to be in a fixed relation with each other's for the phase compensation to work.

Active stabilisation is implemented by way of a fast feedback system 5 configured to correct the channel phase drift by acting simultaneously on all the signals transmitted through the communication channel. This fast feedback 5, while completely removing the phase drift for the bright reference, still leaves a slow phase drift over the signals of interest ($\lambda_1, \lambda_2, \ldots, \lambda_n$) that is three to four orders of magnitude slower than the original channel phase drift. Nevertheless, phase noise is reduced.

According to an example, the fast feedback system 5 is implemented in a manner similar to that described in FIG. 2 and FIG. 3A.

This slower drift can be compensated actively or passively. As shown in FIG. 5, the slow drift is compensated actively by way of a slow phase feedback system 6. The slow phase feedback system 6 is similar to the fast feedback system except that it acts separately on each of the signals located at different wavelengths, and removes the residual phase drift affecting each of the signals of interest. According to an example, the slow phase feedback system 6 implemented in a manner similar to that described in FIGS. 2, 3A, and 3B. Although FIGS. 2, 3A, and 3B show a dual band example comprising a signal of interest at $\lambda_1$ and a reference signal at $\lambda_{REF}$, these arrangements may be adapted to include further signals of interest at $\lambda_2, \lambda_3, \ldots \lambda_n$.

Figure 6:
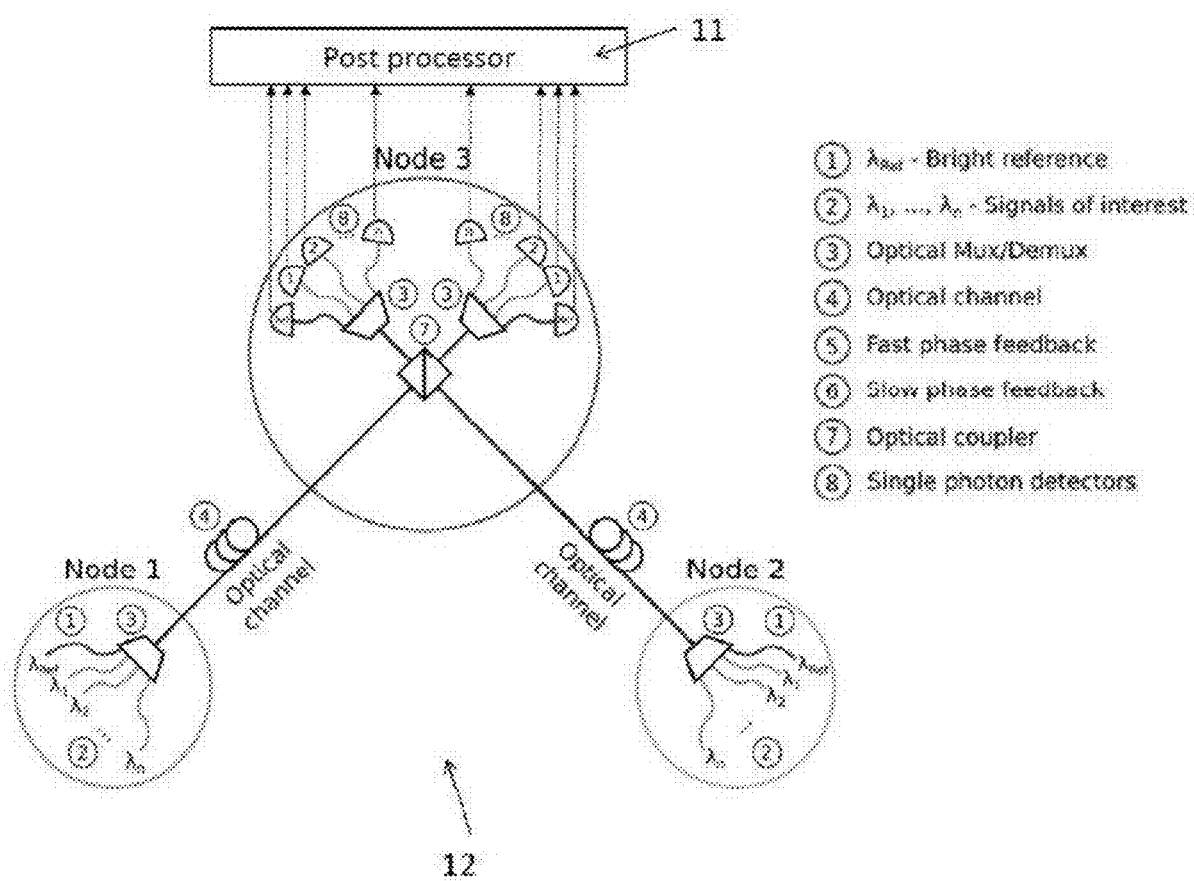
FIG. 6 is a schematic of a 3 node network in accordance with an embodiment with passive stabilisation.

Note that, alternatively, the slow drift could be compensated passively using the passive compensation described in relation to FIG. 6. Note also that compensating the slow drift is optional.

Returning to FIG. 5, the signals produced at the transmitting stations (Nodes 1 and 2) are directed to Node 3, where they are combined through an optical coupler 7. The interference outcome is divided into its different frequency components through demultiplexer 3. The interference outcomes are collected by single photon detectors 8. At Node 3, the signals are passed through the fast feedback system 5 and slow phase feedback system 6.

The noise compensation of the optical networks described above provides the following advantages.

The phase compensation/stabilisation described above does not impose constraints on the network layout or the maximum dimensions of the optical network. Therefore, the noise compensation scheme described above are more versatile.

The phase compensation/stabilisation described above provides the reference signal at a different wavelength from that of the encoded signal. This avoids the interleaving of pulses to accommodate the reference signal, and therefore, a higher clock rate of the quantum pulses is obtained. In other words, by using separate wavelengths for the stabilisation and signal distribution tasks, the signal clock rate does not have to be reduced to transmit stabilisation signals and a higher signal clock rate is achievable at all distances.

Providing the reference signal at a different wavelength avoids the sending of bright reference pulses at the same wavelength which causes Rayleigh scattering. The Rayleigh noise reduces the Signal-to-Noise ratio (SNR), an effect that in turn limits the maximum distance achievable by the quantum communication protocol. By using reference pulses at a different wavelength from the quantum signal, the SNR at the signal wavelength is improved, which in turn provides an increased maximum distance achievable by the quantum communication protocol.

In other words, longer transmission distances are enabled by the stabilisation techniques described above. By reducing the Rayleigh noise at the wavelength of the signal of interest, this approach increases the Signal-to-Noise ratio at long distances, enabling longer signal transmissions.

A further advantage of the active stabilisation technique used in FIG. 5, compared to the passive technique which will be described below in relation to FIG. 6, is that the different wavelengths $(\lambda_{REF}, \lambda_1, \lambda_2, \ldots, \lambda_n)$ do not need to be in a precise relation with each other's. This simplifies considerably the experimental implementation, as complex frequency dissemination techniques or generation of related wavelengths (through frequency comb for example), are avoided.

In an example of a compensation scheme which is not shown, channel length compensation may not be feasible when the length of the communication channel becomes very long (in the order of hundreds of kilometres). This is due to two reasons: phase modulators with a large compensation range (fibre stretchers) are not fast enough to compensate for the fast phase noise introduced by long communication channels, and moreover, the compensation range of common fibre stretchers is still not long enough to compensate for the optical path contraction/expansion occurring over long communication channels. By contrast, the fast feedback system 5 of the network of FIG. 5 does not use a fibre stretcher.

FIG. 6 shows a schematic illustration of a three-node network 12 in which noise reduction is applied. The network 12 of FIG. 6 is similar to that of FIG. 5 except that the noise compensation is passive. In this case, Node 3 does not include feedback blocks 5 and/or 6. Instead, Node 3 is coupled to a post processor 11. The post processor 11 is connected to the detectors of Node 3 which detect the interference outcomes of signals at different wavelengths separately.

Different wavelengths $(\lambda_{REF}, \lambda 1, \lambda 2, \ldots, \lambda n)$ need to be in a fixed frequency/phase relationship with each other's. By fixed frequency and/or phase relationship, it is meant that $(\lambda_{REF}, \lambda 1, \lambda 2, \ldots, \lambda n)$ have a precise relationship with one another such as by means of optical phase locking, frequency shifting or optical frequency comb generation. In this case, the optical channels' phase offset information is retrieved from the interference of the bright reference signals, and it is then used in the phase reconciliation stage occurring during the post processing of the interference outcomes.

In an example, frequency dissemination techniques are used to provide optical wavelengths $(\lambda_{REF}, \lambda 1, \lambda 2, \ldots, \lambda n)$ having a precise relationship. Alternatively, the related wavelengths are generated through frequency combs.

In the passive compensation arrangement of FIG. 6, compensation is made for the phase after the detection stage. For example, referring back to FIG. 2, the processing is performed after the detection by detectors D1 and D0.

In this arrangement, the intensity of the interference outcome can be used to quantify the phase offset between the phase reference frames by inverting the relation connecting the interference intensity or count rate with the phase offset using equation (7) above $$C = C0 + C1(1 - \cos \Delta\vartheta) \tag{7}$$

Since reference and information signal are phase related, by knowing the offset between the reference signals, it is possible to estimate the phase offset between the signals of interests as well. This enables correct interpretation of the interference outcome for the signals of interest. The detector clicks of D0 and D1 due to information signals can therefore be discarded, reversed or kept dependent on the phase measurement. In many phase encoded protocols, Alice and Bob can pick for their pulses any phase value in the [0,2*pi) phase range. However, by knowing the phase offset between the encoding reference frame (i.e. $\Delta\vartheta$), and their encoded phase, Alice and Bob can reconstruct what type of interference outcome the should expect (constructive/destructive or random), and they can then check their expected interference outcome with Charlie's measurement output.

FIGS. 5 and 6 show active and passive stabilisation.

For the active stabilisation of FIG. 5, fast stabilisation is used which can be optionally tuned with the slow stabilisation With active stabilisation, there is active cancellation of the phase noise through an active phase feedback.

When active stabilisation is executed on all the $\lambda$s (using an error signal provided by the interference $\lambda_{REF}$), this will compensate for most of the noise introduced by the communication channel.

In such scenario, the residual phase noise on $\lambda_1$ will be slow, and can be removed actively (through active phase stabilisation) or passively (in postprocessing).

When active stabilisation is employed in a dual-band system, the following configurations are possible:
1. Active stabilisation of all $\lambda$s through a fast phase feedback that uses the interference outcome of $\lambda_{REF}$ as error signal, and passive phase residual noise compensation on $\lambda_1$ in post processing.
2. Active stabilisation of all $\lambda$s through a fast phase feedback that uses the interference outcome of $\lambda_{REF}$ as error signal, and active stabilisation on $\lambda_1$ through a slow feedback acting solely on $\lambda_1$.

In FIG. 5 double active stabilisation is shown, a fast one (acting on all $\lambda$s, $\lambda_{REF}$ and $\lambda_1$) and a slow one (on $\lambda_1$).

When active stabilisation is executed on all $\lambda$s (using the interference information provided by $\lambda_{REF}$), it is not necessary that the different wavelengths ($\lambda_{REF}$ and $\lambda_1$) are in fixed relation to each other's for a successful active or passive stabilisation of $\lambda_1$.

With the passive stabilisation of FIG. 6, phase noise compensation is used in just the post processing phase.

In a dual-band scenario, two possible examples are:
a. Passive phase noise compensation on both $\lambda_{REF}$ and $\lambda_1$.
b. Active stabilisation of all $\lambda$s through a fast phase feedback that uses the interference outcome of $\lambda_{REF}$ as error signal, and passive phase residual noise compensation on $\lambda_1$ in post processing.

In the scenario (a.) r the wavelengths ($\lambda_s$) may be in a fixed phase relation to work. By fixed frequency and/or phase relationship, it is meant that ($\lambda_{REF}, \lambda_1, \lambda_2, \ldots, \lambda_n$) have a precise relationship with one another such as by means of optical phase locking, frequency shifting or optical frequency comb generation. In this case, the optical channels' phase offset information is retrieved from the interference of the bright reference signals, and it is then used in the phase reconciliation stage occurring during the post processing of the interference outcomes.

According to an example which is not shown, the network of FIG. 5 or FIG. 6 is configured as a system for interferometry. In said system, the first, second and third node are configured as described in relation to FIG. 5 or FIG. 6. At node 3 (detection unit), the signals of interest are interfered with each other.

The interferometry system may be used in astronomy. In astronomy, optical signals may be collected by two (or more) distant telescopes, and then interfered. The phase of the optical signals determines the outcome of interference, and the outcome of the measurement. In an example the signals are weak and at the level of single photons. By interfering the optical signals from two distant telescopes, the observations can be made. The larger the distance between the telescopes, the higher the resolution of the observation. The network described herein enables the phase reconciliation of optical signals transmitted over long distances.

Whilst certain embodiments have been described, these embodiments have been presented by way of example only, and are not intended to limit the scope of the inventions. Indeed, the novel devices, and methods described herein may be embodied in a variety of other forms; furthermore, various omissions, substitutions and changes in the form of the devices, methods and products described herein may be made without departing from the spirit of the inventions. The accompanying claims and their equivalents are intended to cover such forms or modifications as would fall within the scope and spirit of the inventions.

The invention claimed is:

1. An optical system comprising a first emitter and a receiver,
said first emitter comprising an encoding unit configured to encode information using phase on a first optical information signal, said first information signal having a single first wavelength, said emitter being configured to output a reference signal, said reference signal having a reference wavelength which is different to the first wavelength, the emitter further comprising a multiplexer configured to multiplex the first information signal and the reference signal to produce a multiplexed first signal and output the multiplexed first signal to a communication channel,
said receiver comprising:
a de-multiplexer configured to de-multiplex the multiplexed first signal received from the emitter to extract the first information signal and the reference signal;
a decoder configured to decode the phase information in the first information signal; and
a phase compensation unit configured to estimate the phase change of the first information signal caused by the communication channel from the first reference signal and to compensate the decoder for the phase change of the first information signal caused by the communication channel.

2. An optical system according to claim 1, wherein the difference between the first wavelength and the reference wavelength is 4% or less.

3. An optical system according to claim 1, wherein the phase compensation unit comprises a first stage and a second stage, wherein said first stage compensates the phase of the information signal using information from the first reference signal and the second stage compensates the phase of the information signal using information having the first wavelength.

4. An optical system according to claim 3, wherein the first emitter is configured to send a dim reference signal to the receiver, said dim reference having the first wavelength, wherein the dim reference has not been encoded by the encoder, the second stage compensating the phase of the information signal using the dim reference.

5. An optical system according to claim 1, wherein the phase compensation unit provides active phase compensation and comprises a phase modulator.

6. An optical system according to claim 3, wherein the phase compensation unit provides active phase compensation and comprises a phase modulator in the first stage and a fibre stretcher in the second stage.

7. An optical system according to claim 1, further comprising:
a second emitter, wherein said second emitter comprises an encoding unit configured to encode information using phase on a second optical information signal, said second information signal having said first wavelength, said emitter being configured to output a second reference signal having said reference wavelength, the emitter further comprising a multiplexer configured to multiplex the second information signal and the second reference signal to produce a multiplexed second signal and output the multiplexed second signal to a communication channel,
and wherein the decoder is configured to decode the phase information in the first and second information signals; and the phase stabilisation element configured to estimate the phase change of the first and second information signals caused by the communication channel from the first and second reference signals.

8. An optical system according to claim 7, configured as a quantum communication system, wherein the emitter further comprises an attenuator configured to attenuate the first information signal leaving the emitter into a series of weak light pulses, where the phase encoded pulses have an average intensity of less than one photon and the first reference signal has a signal intensity that is greater than the average intensity of the phase encoded photon pulses.

9. An optical system according to claim 7, wherein the phase compensation unit is configured to determine the phase compensation from the interference of the received first and second reference signals.

10. An optical system according to claim 1, wherein the phase compensation unit is provided in the receiver unit.

11. An optical system according to claim 1, wherein the phase stabilisation element comprises a post-processor.

12. An optical system according to claim 7, wherein the decoder of the optical network comprising an interference element configured to interfere the first and second reference signals and the first and second information signals, the output of the interference element being selectively directed towards at least one detector, the presence or absence of a signal being received at the at least one detector due to the interference of the first and second information signals providing a bit stream and a quantum key being formed from the bit stream.

13. An optical system according to claim 12, wherein the phase compensation unit is configured to integrate the received signals from the detector due to the interference of the first and second reference signals and determine phase offset information from the interference of the received first and second reference signals at the reference wavelength.

14. An optical system according to claim 13, wherein phase stabilisation element comprises a post-processor, said post processor being configured to select, ignore or reverse bits of the bit stream dependent on the derived phase offset information.

15. An optical system according to claim 13, wherein phase stabilisation element provides active stabilisation by compensating the phase of the information signals prior to interference, a control signal for the active phase stabilisation being dependent on the derived phase offset information.

16. An optical system according to claim 7, wherein the first emitter and the second emitter each comprise a laser configured to generate the information signals at the first wavelength.

17. An optical network according to claim 16 comprising a phase-locked-loop configured to lock the laser of the first emitter with the laser of the second emitter.

18. A quantum communication system comprising the optical network according to claim 1, wherein the quantum communication system is configured to distribute a key between the first sending unit and the second sending unit.

19. An interferometry system comprising the optical network according to claim 1,
wherein the interferometry system is configured to interfere the received first and second signals of interest at the detection unit.

20. An optical method comprising:
encoding information using phase on a first optical information signal, said first information signal having a single first wavelength,
outputting a reference signal, said reference signal having a reference wavelength which is different to the first wavelength,
multiplexing the first information signal and the reference signal to produce a multiplexed first signal and output the multiplexed first signal to a communication channel;
estimate the phase change of the first information signal caused by the communication channel from the first reference signal; and
decoding the phase information in the first information signal, wherein the decoding is compensated for the phase change of the first information signal caused by the communication channel.

\* \* \* \* \*